US009367603B2

(12) United States Patent (10) Patent No.: US 9,367,603 B2
Keng et al. (45) Date of Patent: Jun. 14, 2016

(54) SYSTEMS AND METHODS FOR BEHAVIORAL SEGMENTATION OF USERS IN A SOCIAL DATA NETWORK

(71) Applicant: Sysomos L.P., Toronto (CA)

(72) Inventors: Brian Jia-Lee Keng, Thornhill (CA); Edward Dong-Jin Kim, Toronto (CA)

(73) Assignee: SYSOMOS L.P., Toronto (CA)

( * ) Notice: Subject to any disclaimer, the term of this patent is extended or adjusted under 35 U.S.C. 154(b) by 0 days.

(21) Appl. No.: 14/532,823

(22) Filed: Nov. 4, 2014

(65) Prior Publication Data

US 2015/0127653 A1 May 7, 2015

Related U.S. Application Data

(60) Provisional application No. 61/900,135, filed on Nov. 5, 2013.

(51) Int. Cl.
| | | |
|---|---|---|
| *G06F 17/30* | (2006.01) | |
| *H04L 29/08* | (2006.01) | |
| *H04L 12/18* | (2006.01) | |
| *G06Q 50/00* | (2012.01) | |
| *G06Q 30/02* | (2012.01) | |
| *H04L 12/58* | (2006.01) | |

(52) U.S. Cl.
CPC .......... *G06F 17/30598* (2013.01); *G06Q 30/02* (2013.01); *G06Q 50/01* (2013.01); *H04L 51/32* (2013.01); *H04L 67/22* (2013.01); *H04L 12/1813* (2013.01)

(58) Field of Classification Search
CPC combination set(s) only.
See application file for complete search history.

(56) References Cited

U.S. PATENT DOCUMENTS

| 8,886,655 | B1 * | 11/2014 | Nandy | ............... G06F 17/30994 707/749 |
|---|---|---|---|---|
| 2011/0246910 | A1 * | 10/2011 | Moxley | ............. G06F 17/30861 715/758 |
| 2012/0278164 | A1 * | 11/2012 | Spivack | .................. G06Q 10/10 705/14.52 |

(Continued)

FOREIGN PATENT DOCUMENTS

WO 2013113028 A1 8/2013

OTHER PUBLICATIONS

Manning, Christopher D. and Schutze, Hinrich; Foundations of Statistical Natural Language Processing. MIT Press, Cambridge, MA, USA, 1999.

(Continued)

*Primary Examiner* — Shyue Jiunn Hwa
(74) *Attorney, Agent, or Firm* — Blake, Cassels & Graydon LLP; Wilfred P. So

(57) ABSTRACT

There is provided methods and systems for analyzing data from a plurality of users within a social networking platform, comprising: receiving a query for a topic associated with the social networking platform; determining a set of users having at least one social networking behavior on the social networking platform related to the topic; selecting, for each user from the set of users, a pre-defined number of posts and associating each of the pre-defined number of posts with the respective user; segmenting the selected posts for each user to determine a likelihood of each of the selected posts among the set of users; and, clustering the selected posts for each user to define a plurality of clusters and determining a mapping from each user to at least one of the plurality of clusters, each cluster comprising representative topics indicating frequently used topics within the cluster for the pre-defined number of posts between the set of users.

22 Claims, 13 Drawing Sheets

(56) References Cited

U.S. PATENT DOCUMENTS

| | | |
|---|---|---|
| 2013/0081056 A1 | 3/2013 | Hu et al. |
| 2013/0212059 A1 | 8/2013 | Ameri-Yahia et al. |
| 2013/0275527 A1 | 10/2013 | Derloo |
| 2014/0214814 A1* | 7/2014 | Sankar ............... G06F 17/30867 707/723 |

OTHER PUBLICATIONS

Dhillon, Inderjit S. and Modha, Dharmendra S.; Concept Decompositions for Large Sparse Text Data Using Clustering; Mach. Learn. 42, 1-2; Jan. 2001, 143-175.

Matar, G.; International Search Report from corresponding PCT Application No. PCT/CA2014/050157; search completed Dec. 15, 2014.

* cited by examiner

| Segment 1 (119) | Segment 2 (329) | Segment 3 (49) | Segment 4 (136) | Segment 5 (73) |
|---|---|---|---|---|
| #mtvhottest (93) | #inmiddleschool (149) | #starbucks (45) | #mtvhottest (20) | #ripcorymonteith (8) |
| #bestsongever (57) | #thestruggle (144) | #summer (34) | #ripcorymonteith (17) | #royalbaby (6) |
| #ripcorymonteith (50) | #firstdayofschoolthoughts (79) | #music (30) | #bestsongever (11) | #10thingsilove (4) |
| #believetour (31) | #freshmanadvice (78) | #apple (25) | #confissoesdamadrugada (10) | #facebook (4) |
| #directioners (28) | #girlcode (62) | #twitter (25) | #contamealgoquenoseepa (10) | #capricorn (3) |

| Segment 1 (73) | Segment 2 (459) | Segment 3 (49) | Segment 4 (136) | Segment 5 (73) |
|---|---|---|---|---|
| #egypt (20) | #wimbledon (91) | #bbc (19) | #snowden (37) | #direngezipark (55) |
| #bbc (13) | #royalbaby (84) | #news (15) | #bbc (32) | #occupygezi (48) |
| #syria (13) | #bbc (68) | #nhk (14) | #news (32) | #duranadam (47) |
| #cnn (12) | #woolwich (49) | #ldnews (13) | #turkey (32) | #direngeziparki (46) |
| #morsi (8) | #bbcqt (47) | #nhknews (13) | #obama (31) | #direngezi (41) |

FIG. 6

| Segment 1 (188) | Segment 2 (191) | Segment 3 (97) | Segment 4 (333) | Segment 5 (109) |
|---|---|---|---|---|
| #snowden (19) | #xboxone (97) | #android (23) | #sdcc (48) | #pax (24) |
| #siria (18) | #gamescom (82) | #apple (22) | #royalbaby (39) | #sdcc (21) |
| #chile (14) | #ps4 (76) | #iphone (16) | #breakingbad (33) | #evo2013 (16) |
| #cpmx4 (14) | #grav (65) | #google (15) | #sharknado (28) | #paxprime (16) |
| #espa (14) | #fifa14 (41) | #microsoft (14) | #wimbledon (23) | #gamescom (12) |

FIG. 8

| Segment 1 (144) | Segment 2 (137) | Segment 3 (123) | Segment 4 (61) | Segment 5 (512) |
|---|---|---|---|---|
| #waktusolat (14) #salamaidilfitrito (13) #salamramadhanto (10) #gguu (9) #prayforegypt (9) | #mtvhottest (79) #ripcorymonteith (29) #voteonedirection (26) #believetour (23) #heartbreaker (18) | #instagram (10) #horoscopobizarro (9) #foursquare (8) #lleva (8) #tomorrowland (8) | #mcdmonopoly (40) #imlovinit (35) #myqpflavor (34) #dayofchange (21) #flipyourmorning (19) | #backtoschool (88) #summer (81) #fashion (73) #contest (67) #sweepstakes (64) |

SYSTEMS AND METHODS FOR BEHAVIORAL SEGMENTATION OF USERS IN A SOCIAL DATA NETWORK

CROSS-REFERENCE TO RELATED APPLICATIONS

The present application claims priority from U.S. Provisional Application No. 61/900,135 filed on Nov. 5, 2013 incorporated herein by reference.

TECHNICAL FIELD

The following generally relates to analyzing social network data.

BACKGROUND

In recent years social media has become a popular way for individuals and consumers to interact online (e.g. on the Internet). Social media also affects the way businesses aim to interact with their customers, fans, and potential customers online.

Some bloggers on particular topics with a wide following are identified and are used to endorse or sponsor specific products. For example, advertisement space on a popular blogger's website is used to advertise related products and services.

Social network platforms are also used to influence groups of people. Examples of social network platforms include those known by the trade names Facebook, Twitter, LinkedIn, Tumblr, and Pinterest. Popular or expert individuals within a social network platform can be used to market to other people. Quickly identifying popular or influential individuals and conversations becomes more difficult when the number of users and conversations within a social network grows. Furthermore, accurately identifying influential individuals within a particular topic is difficult. Based on the lack of information and authenticity of information shared on social media networks for each user and profile, it is difficult to determine common preferences and interests.

BRIEF DESCRIPTION OF THE DRAWINGS

Embodiments will now be described by way of example only with reference to the appended drawings wherein:

FIG. 4 illustrates one example segmentation result.

FIG. 5 illustrates the example segmentation result of FIG. 4 shown as a word cloud.

FIG. 6 illustrates another example segmentation result.

FIG. 8 illustrates yet another example segmentation result.

FIG. 10 illustrates another example segmentation result.

FIG. 11 illustrates the example segmentation result of FIG. 10 shown as a word cloud.

DETAILED DESCRIPTION OF THE DRAWINGS

Figure 1:
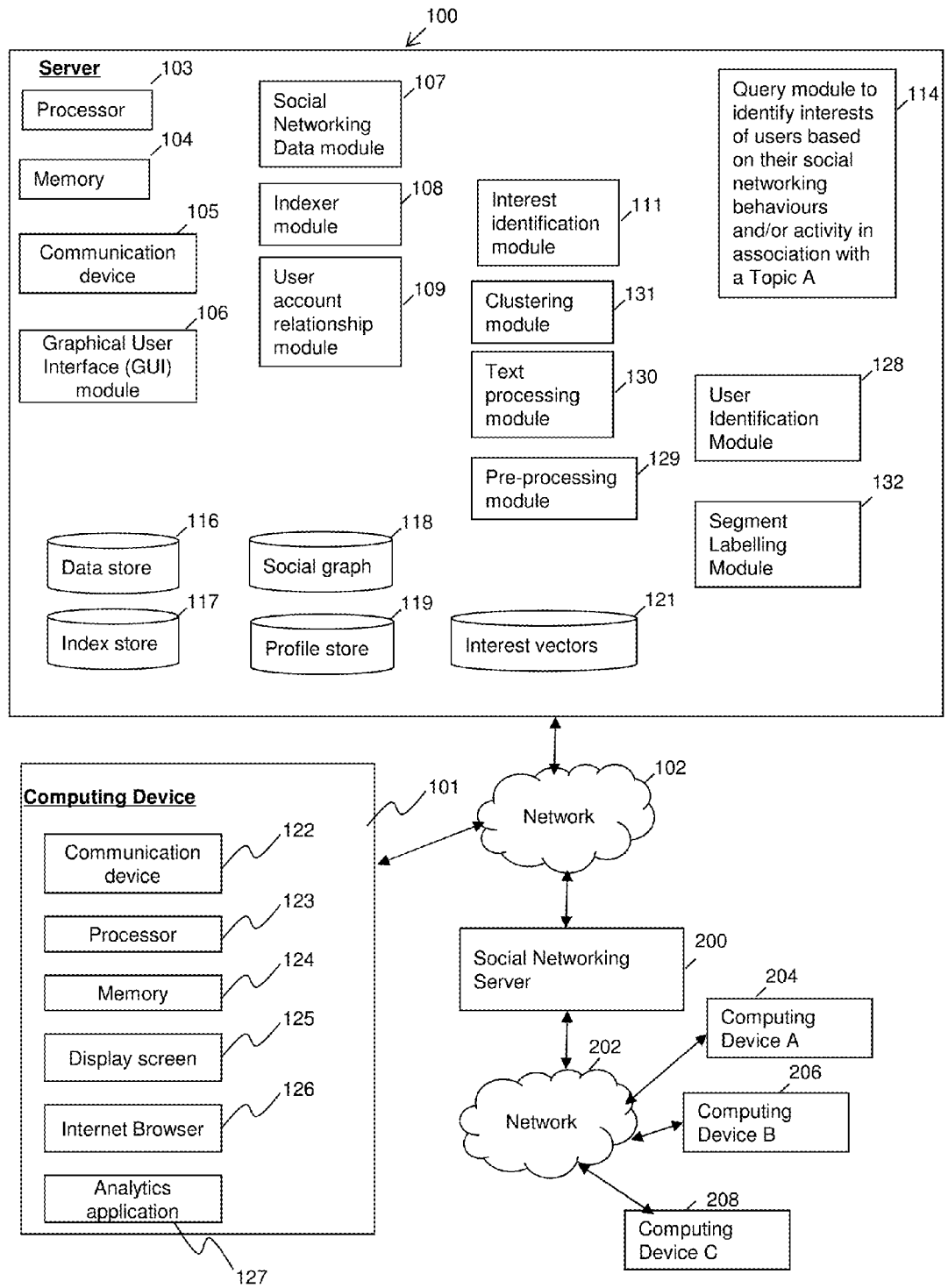
FIG. 1 is a schematic diagram of a server in communication with a computing device configured for dynamic behavioural segmentation of users in a social networking platform.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Social networking platforms include users who generate and post content for others to see, hear, etc via social networking websites and webpages. The posted content by a user can be visible via access to a particular social networking website (e.g. shown as for example but not limited to: newsfeeds, updates, comments, and chat posts). Non-limiting examples of social networking platforms are Facebook, Twitter, LinkedIn, Pinterest, Tumblr, blogospheres, websites, collaborative wikis, online newsgroups, online forums, emails, and instant messaging services. Currently known and future known social networking platforms may be used with principles described herein. Social networking platforms can be used to market to, and advertise to, users of the platforms. It is recognized that it is difficult to identify users relevant to a given topic. This includes identifying influential users on a given topic.

Current social media analytics have used many of the same metrics used in traditional marketing such as demographics (gender, geography) and customer input preferences and profile characteristics. These metrics have been based on user input information associated with creating and generating a user's social networking profile. As will be described, they can also lead to inaccurate results as the metrics are based on authenticity of user input as well as the extent to which information has been provided. That is, providing incorrect or a lack of input information relating to various aspects (e.g. gender, geography, preferences) of a user's profile results in incorrect analytics statistics.

Other media analytics track statistics on followers/friends, engagement and mentions. However such statistics are directed to an algebraic formula of the number of followers and the number of mentions (e.g. "tweets" for Twitter, posts, messages, etc.).

However none of the existing metrics track user segmentation and behaviours. As used herein, the term "user segmentation" can refer to for example dividing a target market data into subsets of consumers, called segments that have common attributes or needs. In general, behavioural segmentation as used herein refers to a computer-implemented method and system for dynamically tracking and grouping consumers and/or users based on specific behavioural patterns and activities they display when interacting with social networking platforms (e.g. via content of social media conversations, "tweets" and/or posts and/or comments and/or chat sessions) such as social networking websites.

The proposed systems and methods, as described herein, dynamically determine and calculate user behaviour segmentation patterns associated with user activity in relation to social networking platforms. This information can subsequently be useful for designing and implementing strategies to target specific needs of individual "segments".

Identifying relevant data to use for social segmentation and behavioural segmentation in social networking platforms presents many challenges, a few exemplary challenges noted below such:

Data Availability: Extracting data from social networking platforms (e.g. websites and/or servers) can be difficult due to both the volume of data and costly fees for access. Social media web sites such as Facebook and Twitter guard their data diligently only allowing access to public data. Additionally, they charge for full access to their private data and only allow a limited subset of it to be dispensed for public use.

User Anonymity: Many online users purposely enter false information or omit non-required fields to remain anonymous. This leads to a sparse or inaccurate set of data (e.g. in relation to creation of a profile) that makes it difficult to draw concrete conclusions about a user base.

Unstructured & Semi-structured Data: Social data typically takes the form of unstructured text data. The friend/follower data also takes the form of a semi-structured graph or network. This social data is typically not formatted into structured relational tables that can be consumed by existing business intelligence applications.

In one aspect of the present invention, the methods and systems for dynamically identifying the behavioural segmentation patterns (e.g. analyzing user behaviour in the form of their "tweet history" for Twitter users) of social networking users associated with one or more social networking platforms is desirable for companies in order, for example, to target individuals and groups of individuals who can potentially broadcast and endorse a brand's message.

Several social media analytics companies claim to provide social media analytics. However, these are based on sparse and inaccurate data (e.g. inaccurate user profile information associated with a social networking website). These analytics are only reported for the users who volunteer to provide the data in their user profiles (e.g. geographic location or gender). Otherwise, no information can be gleaned from the user profiles. This makes it difficult to perform segmentation with so many missing and potentially inaccurate fields. They are also directly dependent upon the user input of information. In one example, a user may have their biographical field filled in but their location may be missing. These examples make it difficult to extract meaningful segments from this data. Moreover, the information extracted is unreliable and likely to be noisy due to the inaccuracies of users self-reported profile data. Using this sparse and unreliable data may actually bias the segmentation.

However, it is herein recognized that many companies use a metric that is not a true user segmentation metric that defines user behavioural patterns in relation to common attributes, but only as an algebraic formula of the number of followers or the number of mentions.

More generally, the proposed systems and methods provide a computer-implemented method and system to determine and analyze user behaviours (e.g. in relation to content or a particular common topic of conversation or "tweets" associated with a social networking platform) for a number of users for the social networking platform. The system and method further includes determining other overlapping or commonality in the behaviour patterns of the users (e.g. for those users that shared a common topic or conversation). The result providing an analysis of user segmentation patterns relating to social networking activity (e.g. posts).

In one aspect of the present invention, there is provided a computer implemented method for analyzing data from a plurality of users within a social networking platform, comprising: receiving a query for a topic associated with the social networking platform; determining a set of users having at least one social networking behaviour on the social networking platform related to the topic; selecting, for each user from the set of users, a pre-defined number of posts and associating each of the pre-defined number of posts with the respective user; segmenting the selected posts for each user to determine a likelihood of each of the selected posts among the set of users; and, clustering the selected posts for each user to define a plurality of clusters and determining a mapping from each user to at least one of the plurality of clusters, each cluster comprising representative topics indicating frequently used topics within the cluster for the pre-defined number of posts between the set of users.

Referring to FIG. 1, a schematic diagram of a system for behavioural segmentation of users in a social data network is shown. A server 100 is in communication with a computing device 101 over a network 102. The server 100 obtains and analyzes social network data (e.g. provided via one or more social networking servers 200 in communication with a plurality of social networking users via computing devices 202, 204 and 206 over network 202) and provides results to the computing device 101 over the network 102. The computing device 101 can receive user inputs through a GUI to control parameters for the analysis.

It can be appreciated that social network data includes data about the users of the social network platform and/or data relating to activity associated with users interacting with the social networking platform (e.g. comments, posts, "tweets", and updates in newsfeed or update screen) as well as the content generated or organized, or both, by the users. Non-limiting examples of social network data includes the user account ID or user name, a description of the user or user account, the messages or other data posted by the user, connections between the user and other users, location information, etc. An example of connections is a "user list", also herein called "list", which includes a name of the list, a description of the list, and one or more other users which the given user follows. The user list is, for example, created by the given user.

Continuing with FIG. 1, the server 100 includes a processor 103 and a memory device 104. In an example embodiment, the server includes one or more processors and a large amount of memory capacity. In another example embodiment, the memory device 104 or memory devices are solid state drives for increased read/write performance. In another example embodiment, multiple servers are used to implement the methods described herein. In other words, in an example embodiment, the server 100 refers to a server system. In another example embodiment, other currently known computing hardware or future known computing hardware is used, or both.

The server 100 also includes a communication device 105 to communicate via the network 102. The network 102 may be a wired or wireless network, or both. The server 100 also includes a GUI module 106 for displaying and receiving data via the computing device 101. The server also includes: a social networking data module 107; an indexer module 108; a user account relationship module 109; an interest identification module 111; and a query module to identify user behavioural segmentation patterns (e.g. in the form of clusters) associated with a Topic A (e.g. a given topic) 114.

The server 100 also includes a number of databases, including a data store 116; an index store 117; a database for a social graph 118; a profile store 119; and a database for interest vectors 121.

The social networking data module 107 is used to receive a stream of social networking data. In an example embodiment, the social networking data is received via one or more social networking servers 200 associated with a social networking platform (e.g. Facebook, Twitter) and one or more social networking users via their respective computing devices 204-208 via a network such as Internet 202. In an example embodiment, millions of new messages are delivered to social networking data module 107 each day, and in real-time. The social networking data received by the social networking data module 107 is stored in the data store 116.

The indexer module 108 performs an indexer process on the data in the data store 116 and stores the indexed data in the index store 117. In an example embodiment, the indexed data in the index store 117 can be more easily searched, and the identifiers in the index store can be used to retrieve the actual data (e.g. full messages).

In one aspect, a social graph is also obtained from the social networking platform server, not shown, and is stored in the social graph database 118. The social graph, when given a user as an input to a query, can be used to return all users following the queried user.

The profile store 119 stores meta data related to user profiles (e.g. users associated with computing devices 204, 206 and 208). Examples of profile related meta data include the aggregate number of followers of a given user, self-disclosed personal information of the given user, location information of the given user, etc. The data in the profile store 119 can be queried.

In an example embodiment, the user account relationship module 109 can use the social graph 118 and the profile store 119 to determine which users are following a particular user.

The interest identification module 111 is configured to identify topics of interest to a given user, called the interest vector. The interest vector for a user is stored in the interest vector database 121.

Referring again to FIG. 1, the server 100 further comprises a user identification module 128, a pre-processing module 129, a text-processing module 130, a clustering module 131 and a segment-labeling module 132. The user identification module 128 is configured to gather and compile a list of users that have shown social networking activity relating to a particular topic (e.g. Topic A). This can include users that have tweeted, or posted comments in a social networking platform about a given search term query (e.g. Topic A) as queried from the data store 116. The pre-processing module 129 is configured to receive data from the user identification module 128 regarding users associated with a particular topic, and for each user to compile a list of their social networking activity (e.g. tweets or posts or comments) specific to respective topics thereby providing a list of topics linked with each user (e.g. mapped to or otherwise connected in a relational database). The result can include for example a "tweet" history for each user associated with the particular topic, Topic A.

In one aspect, the text processing module 130 is configured to analyze and categorize the list of topics associated with each user such as to use word stemming to define commonalities and overlap between topics such as to identify common topics amongst users (e.g. even if the topics are not exactly textual the same, the percentage of similarity would define that certain topics are similar across users, e.g. IPhone and IPhone5). An example of the text processing module 130 is an n-gram processing model that breaks down each topic (e.g. tweet) of conversation for a social networking post into segments and provides an estimation of likelihood of each segment.

In one aspect, the text processing module 130, breaks down or segments each topic for each user associated with a social networking platform as received from the pre-processing module 129 and/or user identification module 128 into textual segments having a pre-defined size. In one aspect, each topic for each user is segmented into pre-defined n-grams (e.g. trigram) using n-gram processing. The process is repeated for all users (e.g. as defined in the user identification module) such as to provide a listing of all n-grams for all users. For each user and each associated segment (e.g. n-gram), the text processing module 130 calculates a likelihood of occurrence defined as a TF-IDF value. Accordingly, the TF-IDF value provides a statistical value of the likelihood of occurrence on an n-gram among all n-grams for all topics on a per user basis (e.g. for each user). In a preferred aspect, the text processing module 130, subsequently filters the segments (e.g. n-grams) having the highest and lowest frequency of likelihood (e.g. highest frequency hashtag segments or lowest frequency hashtag segments are filtered) as they are likely to be irrelevant. The results of the text processing module which include a plurality of vectors corresponding to each respective user and statistical likelihood values (e.g. TF-IDF values) for the respective user for each segment (e.g. n-grams) of each topic. The decomposed segments (e.g. n-grams) and the likelihood values (e.g. TF-IDF values) for each user (e.g. user $U_1$-$U_{T-1}$) are provided to the clustering module which provides clustering based on the segment likelihood values for each segment of each user.

The clustering module 131 is configured to receive the output of the n-gram processing module and cluster the data (e.g. users and associated topics) into specific clusters that have common charasteristics or attributes among each cluster. Each user is mapped to one of the output clusters. The segment labeling module 132 is configured to label each cluster according to a pre-defined number of highest ranked topics (e.g. top ten hashtags for each cluster). Each cluster is associated with a user. The result is provided to the query module 114 that provides a set of k segments, which are labeled with a set of identifying topic labels (e.g. a set of hashtags) denoting the interest of the users in the segment.

Continuing with FIG. 1, the computing device 101 includes a communication device 122 to communicate with the server 100 via the network 102, a processor 123, a memory device 124, a display screen 125, and an Internet browser 126. In an example embodiment, the GUI provided by the server 100 is displayed by the computing device 101 through the Internet browser. In another example embodiment, where an analytics application 127 is available on the computing device 101, the GUI is displayed by the computing device through the analytics application 127. It can be appreciated that the display device 125 may be part of the computing device (e.g. as with a mobile device, a tablet, a laptop, etc.) or may be separate from the computing device (e.g. as with a desktop computer, or the like).

Although not shown, various user input devices (e.g. touch screen, roller ball, optical mouse, buttons, keyboard, microphone, etc.) can be used to facilitate interaction between the user and the computing device 101.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server 100 or computing device 101 or accessible or connectable thereto. Any application or module herein described may be implemented using computer readable/executable instructions that may be stored or otherwise held by such computer readable media.

Figure 2:
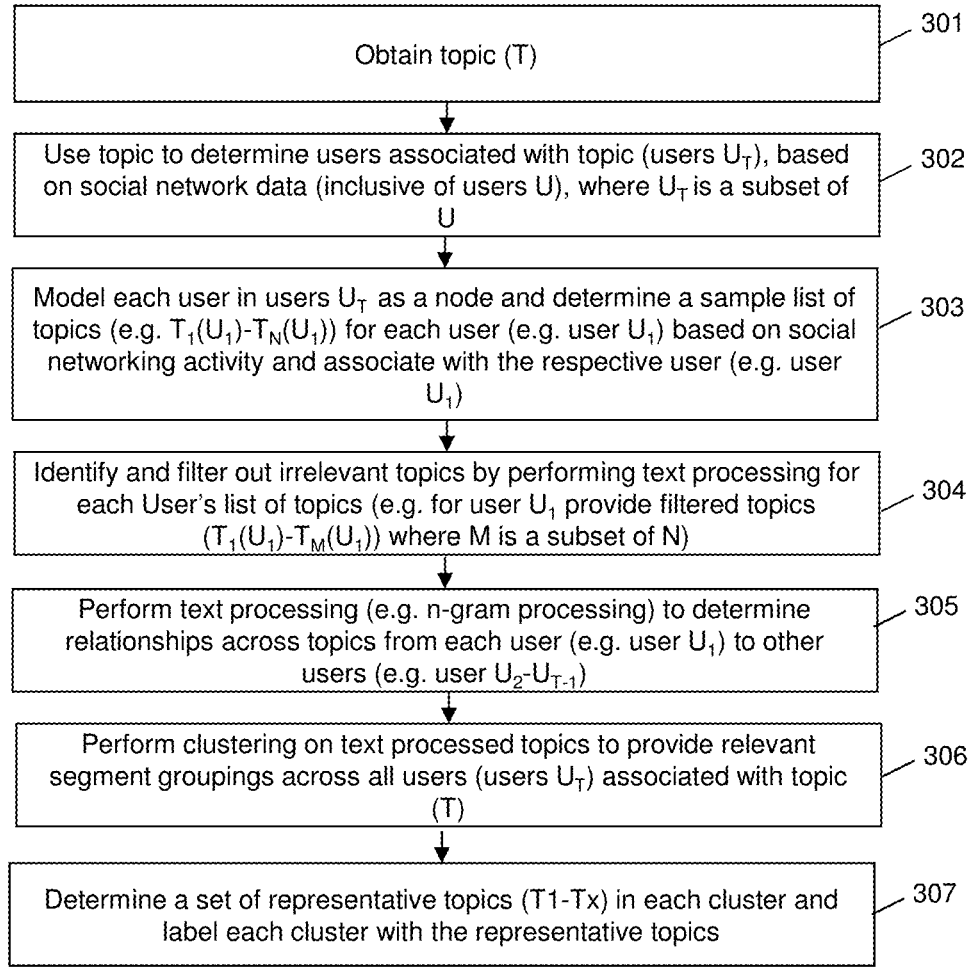
FIG. 2 is a flow diagram of an example embodiment of computer executable instructions for determining segments associated with a particular topic.

Turning to FIG. 2, an example embodiment of computer executable instructions implemented by the server 100 and processor 103 in communication with the user identification module 128, the pre-processing module 129, the text processing module 130, the clustering module 131 and the segment labeling module 132. Referring to FIG. 2, the computer executable instructions shown are configured for execution by the processor 103 for determining one or more dynamical behavioural segments for a plurality of social networking users based on a particular topic of interest, topic T. The process shown in FIG. 2 assumes that social network data is available to the server 100, and the social network data includes multiple users that are represented as a set U. At block 301, the server 100 obtains a topic represented as T. For example, a user may enter in a topic via a GUI displayed at the computing device 101, and the computing device 101 sends the topic to the server 100. At block 302, the server uses the topic to determine users from the social network data which are associated with the topic. This determination can be implemented in various ways and will be discussed in further detail below. The set of users associated with the topic is represented as $U_T$, where $U_T$ is a subset of U. The computer executable instructions of block 302 are implemented by the user identification module 128.

Continuing with FIG. 2, at block 303, the server 100 models each user in the set of users $U_T$ as a node and determines a sample list of topics (e.g. $T_1(U_1)$-$T_N(U_1)$)) for each user (e.g. user $U_1$) based on social networking activity and associate with the respective user (e.g. user $U_1$). As will be described in relation to FIG. 3, in one example this involves collecting a sample of social networking posts (e.g. Tweets for Twitter users) having a pre-defined sample size (e.g. a pre-defined number of recent or randomly selected posts and/or posts during a specific time duration). At block 304, the server 100 identifies and filters out irrelevant topics by performing text processing for each User's list of topics (e.g. for user $U_1$ provide filtered topics $(T_1(U_1)$-$T_M(U_1))$ where M is a subset of N). As discussed in relation to FIG. 3, in one example this step includes extracting text from posts (e.g. tweets, comments, chats and other social networking posts) to determine a listing of topics for all users $U_T$ and normalizing the extracted text while filtering out topics that are pre-determined to be irrelevant. This step further comprises relationship mapping between each textual topics (e.g. hashtags) and the corresponding user that posted the topic.

The computer executable instructions of block 303 and 304 are implemented by the pre-processing module 129.

Referring again to FIG. 2, at block 305, the server 100 performs text processing (e.g. n-gram processing) to determine relationships across topics from each user (e.g. user $U_1$) to other users (e.g. user $U_2$-$U_{T-1}$). The relationships depict the statistical overlap amongst users for each topic (or stems of the topics as provided by breaking down the topic into n-grams) as shown in the exemplary chart below.

| | Tri-gram word stems from the list of topics for all users $U_T: (T_1(U_1, U_{T-1}) - T_N(U_1, U_{T-1}))$ | | | | |
|---|---|---|---|---|---|
| Users | "iph" | "pho" | "hon" | "one" | "the" |
| A | 0.2 | 0.2 | 0.2 | 0.2 | |
| B | 0.3 | 0.3 | 0.3 | 0.3 | |

In the case of n-gram processing, the result is a chart where one dimension shows the users (e.g. U1, U2), another dimension shows each topic broken down into n-grams (e.g. "iph", "pho", "hon", "one", "the") for each user and each cell value represents the TF-IDF statistic.

Generally speaking, the tf-idf statistical value is the term frequency inverse document frequency which is a numerical statistic and provides information on the importance of each broken down segment of the topic words (e.g. a topic broken down into its n-gram) for each topic amongst the various broken down segments of topics for a user. That is, the tf-idf for a segment of a topic word (e.g. "iph") reflects the statistic value based on the number of times the segment (e.g. "iph") appears in the listing of all topics for the user. That is, for user1, the segmented topic (e.g. "iph") may have a statistical probability of X among all topics (e.g. topics $T_1(U_1)$-$T_M(U_1)$ as shown in FIG. 2) for the particular user, user1. The n-grams TF-IDF provide a statistical likelihood of the occurrence of the n-gram for the particular user. Accordingly, for each user, a listing of TF-IDF is output associated with respective n-grams. The vector of n-gram tf-idf's are thus fed into the clustering module at block 306.

The computer executable instructions of block 305 are implemented by the text processing module 130 (FIG. 1).

Referring to FIG. 2, at block 306, the server 100 performs clustering on text processed topics (e.g. receiving a vector of TF-IDF values for each n-gram of a respective user) to provide relevant segment groupings across all users (users $U_T$) associated with a topic. The computer executable instructions of block 306 are implemented by the clustering module 131 (FIG. 1).

Referring to FIG. 2, at block 307, the server 100 determines a set of representative topics (T1-Tx) in each cluster and label each cluster with the representative topics. An example of this is shown in FIGS. 4, 6, 8 and 10. The computer executable instructions of block 307 are implemented by the segment labeling module 132 that is in communication with the query module 114 for providing the output results to the computing device 101.

In one embodiment, not illustrated in FIG. 2, subsequent to the step illustrated at block 305, the text processing module 130 (e.g. n-gram processing) identifies and filters out outlier nodes within the topic network. The outlier nodes are outlier users that are considered to be separate from a larger population or clusters of users in the topic network. That is, they can relate to users that have a topic without a sufficient measure of commonality with topics of other users (e.g. as determined by the n-gram processing, the subsets of a particular topic for a user does not statistically overlap over a pre-defined threshold with the subsets of each topic for other users. The set of outlier users or nodes within the topic network is represented by UO, where UO is a subset of UT. In one aspect, the text processing module 130 outputs the users UT, with the users UO removed.

Figure 3:
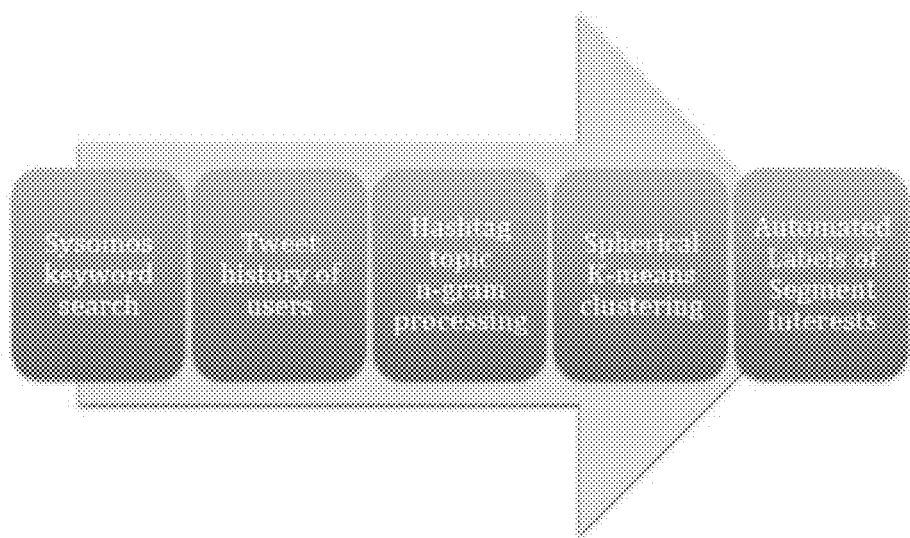
FIG. 3 is a flow diagram of another example embodiment of computer executable instructions for determining segments associated with a particular topic within a social networking platform of Twitter.

Referring to FIG. 3, shown is an example implementation of the blocks 301-307 in FIG. 2 for performing dynamic segmentation of data relating specifically to Twitter users. The exemplary process depicted in FIG. 3 is implemented by the server 100 of FIG. 1 (e.g. user identification module 128, pre-processing module 129, text processing module 130, clustering module 131, and segment labeling module 132).

Example of Dynamic Behavioural Segmentation Process for Twitter Users and Topics (e.g. Implemented by Server 100)

The segmentation method an example of which is depicted in FIG. 3 thus uses these exemplary steps:

1. Gather list of users for a particular query or topic. This list can be compiled, for example, by gathering all users who have tweeted about a given search term query (e.g. Tweets from users who have used "iPhone" in their tweets, in the past 6 months), or simply all followers of a specific brand handle. This step can be implemented by the user identification module 128 in FIG. 1.

2. For each user, gather a random sample listing of their tweet history (e.g. posts related to a specific social networking platform Twitter). In one aspect, the sample will be taken from their recent tweets to get an accurate picture of their current interests and preferences. In a preferred aspect, a sample size between 500 to 1000 tweets is preferred to extract enough hashtags to be useful.

3. Extract the hashtags from each of the user's historical tweets, and associate each one to the corresponding user. The result should be a map from user to a list of hashtags.

4. Perform text processing on each user's list of hashtags, normalizing the text to lowercase, and removing common hashtags that convey no meaning such as "#RT" (i.e. stop-word removal). Steps 2-4 can be implemented by the pre-processing module 129 of FIG. 1.

5. From the full list of hashtags, use a character n-gram model to represent the hashtags using term-frequency inverse document frequency (TF-IDF). The result of this process is a document-term matrix where the columns represent the users, the row represents the n-grams, and each cell represents the TF-IDF statistic. This step can be implemented by the text processing module 130 in FIG. 1.

In a preferred aspect, a trigram (n=3) model for n-gram processing results in an optimal balance between processing speed and segmentation quality.

6. Using an unsupervised machine learning clustering method for a pre-defined number of clusters e.g. in one aspect k=[5, 9] gives highly relevant segments. In a preferred aspect, spherical k-means clustering algorithm is particularly effective in clustering high dimensional text data. The final result of this algorithm is a mapping from each user to one of the k clusters. This step can be implemented by the clustering module 131 of FIG. 1.

However, one of the aspects of a clustering analysis is the labeling of the clusters. To address this issue, an additional step is added to label the clusters (e.g. implemented by the segment labeling module 132 in FIG. 1): 1. For each cluster, collect all the hashtags associated with each user in that cluster. 2. For each hashtag, count the number of users who have used that hashtag in that cluster. 3. Label that cluster with the top hashtags for each cluster. In a preferred embodiment, the top ten or so hashtags provides a good labeling of the cluster.

Referring to FIG. 3, an example is shown of dynamic segmentation process for analyzing social networking user behaviours for Twitter as implemented by the server 100 (e.g. modules 128, 129, 130, 131, 132). Referring again to FIG. 3, the end result provided by the steps according to the present example is a set of k segments, which are labeled with a set of hashtags denoting the interests of the users in the segment. In a preferred aspect, this type of behavioural segmentation is very powerful for marketers and CRM applications.

Examples of Segmentation Case Studies:

In this subsection, two case studies are presented for "Starbucks" and "BBC" topic queries in detail (implementable by the system of FIG. 1 and the server 100) and additionally present results for "Xbox One" and "Mccafe". As discussed, these segments provide actionable information such as: 1. Identify segments of users that differ by interests. 2. Identify the relative size of each segment. 3. Target social media campaigns to align with the specific topics that your users are most interested in. 4. Engage with individual users in the segments that matter most. 5. Measure how your user base changes over time.

Example of Selected Topic for Dynamic Segmentation Analysis: Starbucks

The first case study shows the result of behavioral segmentation on Twitter users who tweeted about "Starbucks" between May 2013 and July 2013. FIG. 4 shows the results with the top hash tags for each segment. The numbers in parenthesis beside each segment show the size of the segment. Similarly, the numbers beside the hashtags show the frequency of users in that segment who have used the corresponding hashtag.

Turning to FIG. 4, top hashtags for segmentation of Twitter users (k=5) who tweet about "Starbucks" (e.g. as output by server 100 of FIG. 1, and/or FIG. 2-3 process steps). Numbers in parenthesis indicate frequency of hashtags.

Referring to FIG. 5, shown is a segmented word cloud for the same segmentation results (e.g. segmentation of Twitter users (k=5) who tweet about "Starbucks"). The different colors of the word cloud show the different segments while the font size of each word shows its relative size. Other visual representation indicators as envisaged by a person skilled in the art may be used.

The word cloud allows convenient visualization of characteristics about each of the segments. For example, the following points can be seen directly from the word clouds:

- The navy blue and bright green segments indicate a segment of younger users whose tweet topics include "#inmiddleschool", "#directioners" (One Direction music fans), and "#believetour" (Justin Bieber music tour).
- The dark red segment consists of non-English speaking users with phrases such as "#cancionesperfectas" ("perfect songs" in Spanish), "#avaliando" ("evaluating" in Portuguese), and "#enunmundodonde" ("in a world where" in Spanish).
- The light blue segment indicates users of topical issues such as "#royalbaby" (Kate Middleton's baby) and "#ripcorymonteith" (the late actor Cory Monteith).
- The last orange colored segment consists of users whose interests include technology, fashion, coffee and travel as indicated by hashtags such as "#google", "#android", "#fashion", "#travel" and "#coffee".

Additionally, since the text font size denotes the relative frequency of the words, one can conclude that the light blue and dark red segments are the smallest, while the light green segment is the largest.

This type of segmentation analysis (as depicted by the system in FIG. 1) is advantageous as the output behavioural segmentation data allows a company to target their social media campaigns. For example, perhaps only the orange colored segment of users who tweet about "#coffee" and "#fashion" are important for a particular company, so in one aspect, further analysis is provided to focus in on these users and analyze their interests. Alternatively, perhaps a company wishes to roll-out a non-English speaking campaign, the users in the dark red segment are prime targets with a Spanish or Portuguese language campaign being the languages of choice.

From this segmented word cloud, one can quickly gain an overview of the different segments in order to pick and choose which segments to further analyze.

Example Directed to Topic ("BBC") for Determining Dynamic Segmentation of Social Networking (e.g. Twitter Users)

Figure 7:
FIG. 7 illustrates the example segmentation result of FIG. 5 shown as a word cloud.

The second case study shows the behavioural segmentation results (e.g. as implemented by server 100 in FIG. 1 and processes in FIGS. 2 and 3 for Twitter users who tweeted about "BBC" (the British Broadcasting Corporation) between May 2013 and July 2013. FIG. 6 shows the results with the top hash tags for each segment. The corresponding word cloud is shown in FIG. 7.

The users for "BBC" are distinctly different from that of Starbucks. Further, some non-obvious results are produced from segmentation:

The dark red segment indicate users who tweet about world issues such as "#usa", "#israel", "#syria", in addition to common topics such as "#music" and "#facebook".

The British Twitter users are represented by the light green segment with hashtags such as "#wimbleton" (British tennis tournament), "#nhs" (British National Health Service), and "#royalbaby".

An interesting crowd of users appears to be from Japan whose tweet topics include: "#nhk" (Japan Broadcasting Corporation), "#niconews" (Japanese news organization), "#nhk24".

The last two segments consist of users who tweet about specific world issues. The light blue one involves hashtags with "#direngazipark" (the Turkish protests at Diren Gezi Park), and the dark blue one involve hashtags about Middle East issues such as "#morsi", "#saudi", and "#cairo".

These distinct clusters allow a company to tailor its Twitter presence with greater precision over other types of social media analytics.

Additional Segmentation Results

Figure 9:
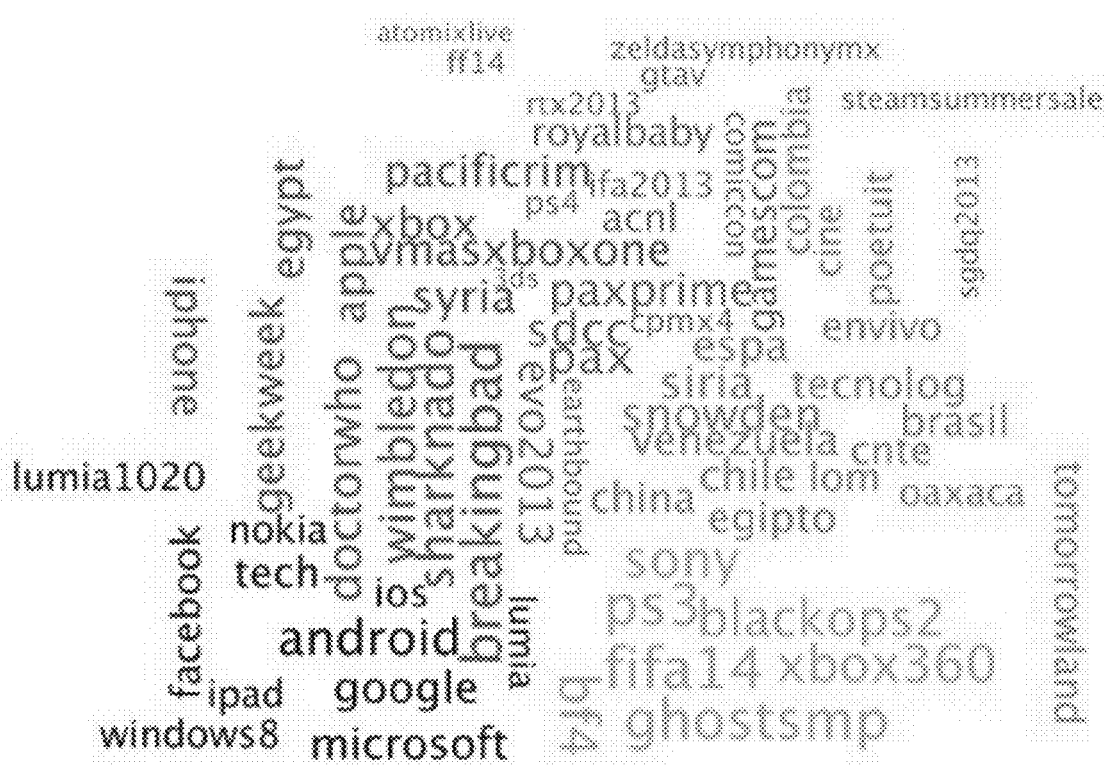
FIG. 9 illustrates the example segmentation result of FIG. 8 shown as a word cloud.

We present two additional segmentation results for Twitter users who tweeted about "Xbox One" and "Mccafe" between July 2013 and August 2013. These are shown in FIG. 8 and FIG. 10 as well as FIGS. 9-11 (e.g. as implementable by server 100 in FIG. 1). Specifically FIG. 8 depicts an example result for the system of FIG. 1 where top hashtags for segmentation of Twitter users (k=5) who tweet about "Xbox One". The numbers in parenthesis indicate frequency of hashtags. FIG. 9 shows an example segmentation of Twitter users who tweet about "Xbox One" in a word cloud orientation where different colors or other visual indicators represent different segments, while the font size denotes the relative size. FIG. 10 shows an example result for top hashtags for segmentation of Twitter users (k=5) who tweet about "Mccafe" and the numbers in parenthesis indicate frequency of hashtags. FIG. 11 indicates an example segmentation of Twitter users who tweet about "McCafe" and different colors and other visual indicators can represent different segments, while the font size denotes the relative size.

Obtaining Social Network Data:

With respect to obtaining social network data, although not shown in FIG. 1 or FIG. 2, it will be appreciated that the server 100 obtains social network data. The social network data may be obtained in various ways. Below is a non-limiting example embodiment of obtaining social network data.

Figure 12:
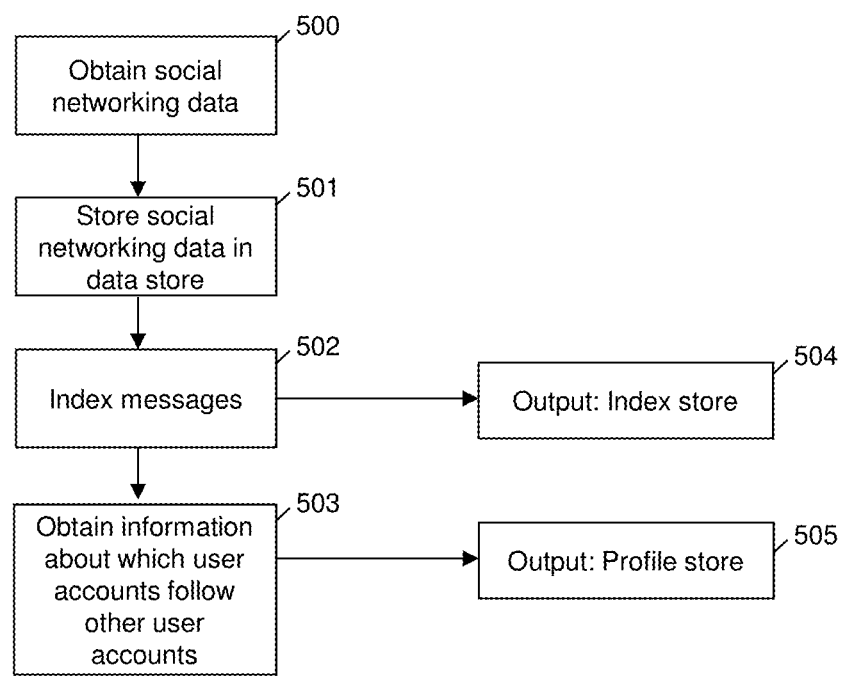
FIG. 12 is a flow diagram of an example embodiment of computer executable instructions for obtaining and storing social networking data.

Turning to FIG. 12, an example embodiment of computer executable instructions are shown for obtaining social network data. The data may be received as a stream of data, including messages and meta data, in real time. This data is stored in the data store 116, for example, using a compressed row format (block 501). In a non-limiting example embodiment, a MySQL database is used. Blocks 500 and 501, for example, are implemented by the social networking data module 107.

In an example embodiment, the social network data received by social networking module 107 is copied, and the copies of the social network data are stored across multiple servers. This facilitates parallel processing when analyzing the social network data. In other words, it is possible for one server to analyze one aspect of the social network data, while another server analyses another aspect of the social network data.

The server 100 indexes the messages using an indexer process (block 502). For example, the indexer process is a separate process from the storage process that includes scanning the messages as they materialize in the data store 116. In an example embodiment, the indexer process runs on a separate server by itself. This facilitates parallel processing. The indexer process is, for example, a multi-threaded process that materializes a table of indexed data for each day, or for some other given time period. The indexed data is outputted and stored in the index store 117 (block 504).

Turning back to FIG. 5, the server 100 further obtains information about which user accounts follow other user accounts (block 503). This process includes identifying profile related meta data and storing the same in the profile store (block 505).

After the data is obtained and stored, it can be analyzed, for example, to identify topics and behavioural interests.

Determining Users Related to a Topic:

With respect to determining users related to a topic, as per blocks 302 in FIG. 2, it will be appreciated that such an operation can occur in various ways. Below are non-limiting example embodiments that can be used to determine users related to a topic.

In an example embodiment, the operation of determining users related to a topic (e.g. block 302 and block 402) is based on the Sysomos search engine, and is described in U.S. Patent Application Publication No. 2009/0319518, filed Jul. 10, 2009 and titled "Method and System for Information Discovery and Text Analysis", the entire contents of which are hereby incorporated by reference. According to the processes described in U.S. Patent Application Publication No. 2009/0319518, a topic is used to identify popular documents within a certain time interval. It is herein recognized that this process can also be used to identify users related to a topic. In particular, when a topic (e.g. a keyword) is provided to the system of U.S. Patent Application Publication No. 2009/0319518, the system returns documents (e.g. posts, tweets, messages, articles, etc.) that are related and popular to the topic. Using the proposed systems and methods described herein, the executable instructions include the server 100 determining the author or authors of the documents.

In another example embodiment of performing the operation of determining users related to a topic (e.g. block 302 and block 402), the computer executable instructions include:

determining documents (e.g. posts, articles, tweets, messages, etc.) that are correlated with the given topic; determining the author or authors of the documents; and establishing the author or authors as the users $U_T$ associated with the given topic.

It will be appreciated that other types of clustering and community detection algorithms can be used to perform clustering by the clustering module 131. The clustering module can utilize one or more of: k-means clustering, spherical k-means clustering, Principal component analysis (PCA), Mean shift clustering, and other types of data clustering techniques can be utilized by the clustering module 131 to handle high-dimensional data.

Figure 13:
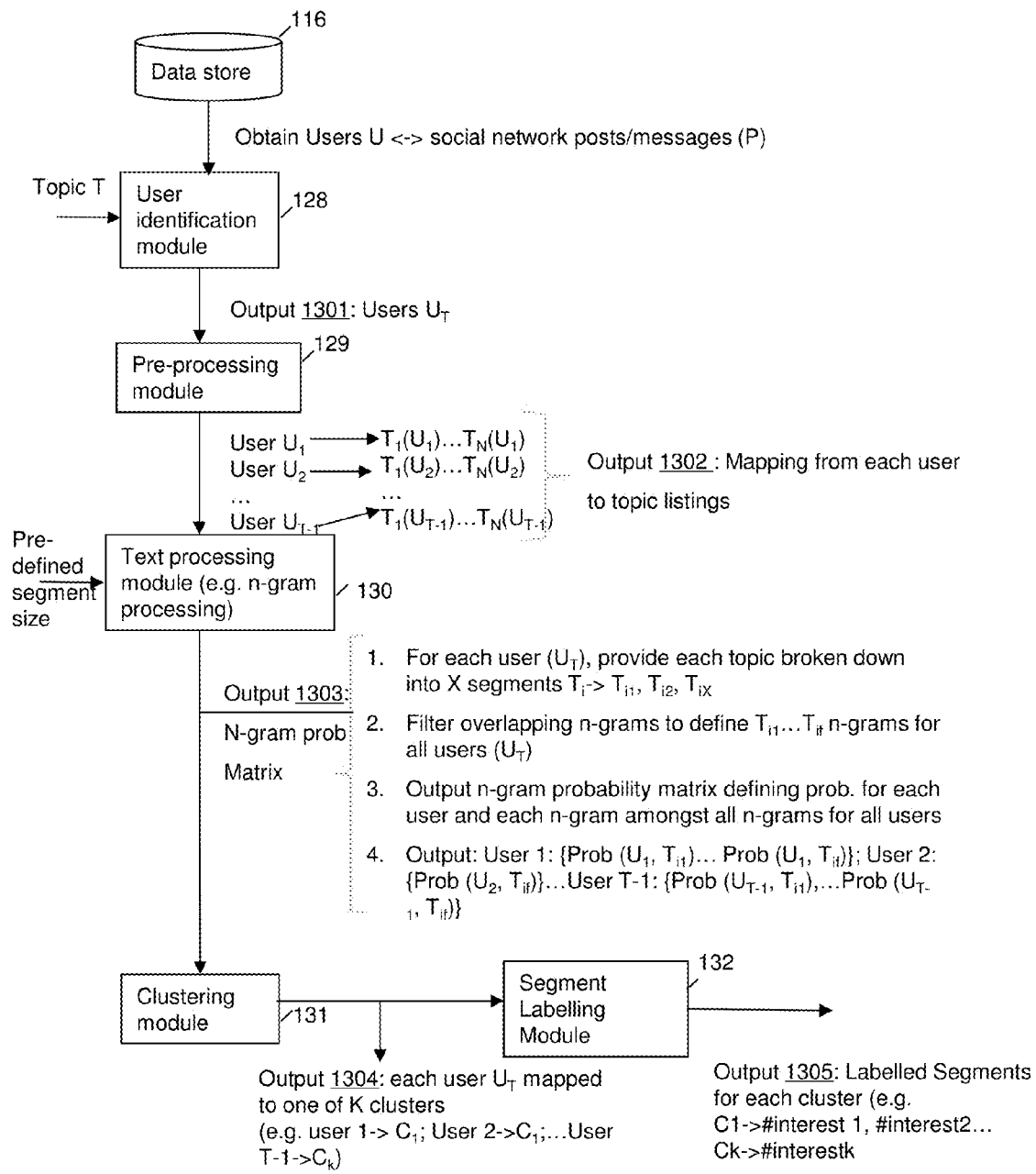
FIG. 13 is a flow diagram of an example embodiment of computer executable instructions associated with the user identification module, pre-processing module, text processing module, clustering module, and segment labeling modules of the server in FIG. 1.

Referring to FIG. 13, shown is a flow diagram of an example embodiment of computer executable instructions associated with each of the computer-implemented user identification module, pre-processing module, text processing module, clustering module, and segment labeling modules of the server in FIG. 1 and the exemplary outputs from each module. As illustrated, the user identification module 128 receives data relating to a plurality of users U and their associated social networking posts/messages (e.g. Tweets). The user identification module 128 then extracts a listing of users $U_T$ that have social networking posts/messages relating to a pre-defined topic T and provides the listing of users $U_T$ as output 1301.

Subsequently, the pre-processing module 129 is configured to provide a mapping from each user to a plurality of topic listings associated with the respective user at output 1302.

The text processing module 130 is then configured to receive the listing of topics and associations with each user $U_T$ such as to calculate an n-gram probability matrix based on a pre-defined segment size defined at the text processing module 130. That is, in one aspect, the text processing module 130 is configured to: for each user ($U_T$), provide each topic broken down into X segments $T_i$->$T_{i1}$, $T_{i2}$, $T_{iX}$ filter overlapping n-grams to define $T_{i1}$ ... $T_{if}$ n-grams for all users ($U_T$) and output n-gram probability matrix (output 1303) which defines probability for each user and each n-gram amongst all n-grams for all users. An exemplary output 1303 defined as: User 1: {Prob ($U_1$, $T_{i1}$) ... Prob ($U_1$, $T_{if}$)}; User 2: {Prob ($U_2$, $T_{if}$)} ... User T-1: {Prob ($U_{T-1}$, $T_{i1}$), ... Prob ($U_{T-1}$, $T_{if}$)}.

The clustering module 131 thus receives a vector of n-gram TF-IDFs for each user $U_T$. The clustering module 131 is then configured to map each user $U_T$ into one of K clusters (e.g. user 1->$C_1$; User 2->$C_1$; ... User T-1->$C_k$).

The segment labeling module 132 is then configured to provide at output 1305, Output 1305: Labeled Segments for each cluster (e.g. C1->#interest 1, #interest2 ... Ck->#interestk).

It will be appreciated that different features of the example embodiments of the system and methods, as described herein, may be combined with each other in different ways. In other words, different modules, operations and components may be used together according to other example embodiments, although not specifically stated.

The steps or operations in the flow diagrams described herein are just for example. There may be many variations to these steps or operations without departing from the spirit of the invention or inventions. For instance, the steps may be performed in a differing order, or steps may be added, deleted, or modified.

The GUIs and screen shots described herein are just for example. There may be variations to the graphical and interactive elements without departing from the spirit of the invention or inventions. For example, such elements can be positioned in different places, or added, deleted, or modified.

Although the above has been described with reference to certain specific embodiments, various modifications thereof will be apparent to those skilled in the art without departing from the scope of the claims appended hereto.

The invention claimed is:

1. A method performed by a server system for analyzing data from a plurality of users within a social data network, comprising:

the server system receiving, via a communication device, a query for a topic associated with the social data network;

responsive to the query, the server system accessing a data store that stores the data from the plurality of users to determine a set of users in the social data network having at least one social networking behaviour on the social data network related to the queried topic, and determining the set of users further comprises segmenting the set of users from the plurality of users in accordance with at least one common attribute of the social networking behaviour related to the queried topic;

for each user from the set of users, applying text processing to posts for each user to extract a list of topic words and associating each of the topic words with the respective user, the posts obtained by accessing the data store;

for each user, segmenting each of the topic words into letter segments and computing a statistical likelihood value of each of the letter segments for the respective user;

using the statistical likelihood values of each of the letter segments, the server system clustering the topic words to define a plurality of clusters and determining a mapping from each user to at least one of the plurality of clusters; and labeling each cluster with one or more highest ranked topic words within the respective cluster used by users mapped to the respective cluster; and outputting the one or more highest ranked topic words mapped to each cluster via the communication device.

2. The method of claim 1, wherein said at least one social networking behaviour comprises at least one of: a tweet, a post, a comment associated with the queried topic in the social data network, and being a follower of the queried topic.

3. The method of claim 1, further comprising the server system using a communication device and a social networking data module to receive a stream of social networking data, which comprises the posts from the set of users, and store the social networking data in the data store.

4. The method of claim 1, wherein the number of letters in each letter segment is three.

5. The method of claim 1, wherein selecting for each user a pre-defined number of posts and associating with the respective user further comprises:

modeling each user in the set of users as a node and determining a list of topics for each user;

extracting text from the posts and filtering out irrelevant topics by performing text processing for each topic associated with each user to output the list of topic words; and, providing a relationship mapping between the topic words and the corresponding user associated with a respective topic word.

6. The method of claim 5, further comprising:

performing text processing on a given topic word to determine relationships across at least a pre-defined size of each letter segment associated with each user to other users of the set of users, the letter segments overlapping each other; and wherein computing a given statistical likelihood value for a given letter segment associated with a given user comprises identifying the number of times the given letter segment appears relative to the number of all topic words associated with the given user.

7. The method of claim 1, wherein the letter segments overlap each other in a given topic word, and the statistical likelihood values are arranged into an n-gram probability matrix based on a pre-defined number of letters for each letter segment.

8. The method of claim 1, wherein clustering further comprises utilizing at least one of: k-means clustering, spherical k-means clustering, Principal component analysis (PCA), Mean shift clustering.

9. A non-transitory computer readable medium comprising computer executable instructions, for when executed by one or more processors are configured for analyzing data from a plurality of users within a social data network, said computer executable instructions configured for:
   receiving, via a communication device, a query for a topic associated with the social data network;
   responsive to the query, accessing a data store that stores the data from the plurality of users to determine a set of users in the social data network having at least one social networking behaviour on the social data network related to the queried topic, and determining the set of users further comprises segmenting the set of users from the plurality of users in accordance with at least one common attribute of the social networking behaviour related to the queried topic;
   for each user from the set of users, applying text processing to posts for each user to extract a list of topic words and associating each of the topic words with the respective user, the posts obtained by accessing the data store;
   for each user, segmenting each of the topic words into letter segments and computing a statistical likelihood value of each of the letter segments for the respective user;
   using the statistical likelihood values of each of the letter segments, clustering the topic words to define a plurality of clusters and determining a mapping from each user to at least one of the plurality of clusters;
   labeling each cluster with one or more highest ranked topic words within the respective cluster used by users mapped to the respective cluster; and
   outputting the one or more highest ranked topic words mapped to each cluster via the communication device.

10. The non-transitory computer readable medium of claim 9, wherein said at least one social networking behaviour comprises at least one of: a tweet, a post, a comment associated with the queried topic in the social data networking, and being a follower of the queried topic.

11. The non-transitory computer readable medium of claim 9, wherein said computer executable instructions further comprise receiving via the communication device a stream of social networking data, which comprises the posts from the set of users, and storing the stream of social networking data in the data store.

12. The non-transitory computer readable medium of claim 9, wherein the number of letters in each letter segment is three.

13. The non-transitory computer readable medium of claim 9, wherein selecting for each user a pre-defined number of posts and associating with the respective user further comprises:
   modeling each user in the set of users as a node and determining a list of topics for each user;
   extracting text from the posts and filtering out irrelevant topics by performing text processing for each topic associated with each user to output the list of topic words; and,
   providing a relationship mapping between the topic words and the corresponding user associated with a respective topic word.

14. The non-transitory computer readable medium of claim 13, wherein said computer executable instructions further comprise:
   performing text processing on a given topic word to determine relationships across at least a pre-defined size of each letter segment associated with each user to other users of the set of users, the letter segments overlapping each other; and
   wherein computing a given statistical likelihood value for a given letter segment associated with a given user comprises identifying the number of times the given letter segment appears relative to the number of all topic words associated with the given user.

15. A computing system comprising for analyzing data from a plurality of users within a social data network, comprising:
   a communication device that receives a query for a topic associated with the social data network;
   a data store that stores data from the plurality of users;
   a processor that, responsive to the query, accesses the data store to determine a set of users in the social data network having at least one social networking behaviour on the social data network related to the queried topic, and determining the set of users further comprises segmenting the set of users from the plurality of users in accordance with at least one common attribute of the social networking behaviour related to the queried topic;
   the processor, for each user from the set of users, applying text processing to posts for each user to extract a list of topic words and associating each of the topic words with the respective user, the posts obtained by accessing the data store ; the processor, for each user, segmenting each of the topic words into letter segments and computing a statistical likelihood value of each of the letter segments for the respective user;
   the processor, using the statistical likelihood values of each of the letter segments, the server clustering the topic words to define a plurality of clusters and determining a mapping from each user to at least one of the plurality of clusters;
   the processor, labeling each cluster with one or more highest ranked topic words within the respective cluster used by users mapped to the respective cluster; and
   the communication device further configured to transmit the one or more highest ranked topic words mapped to each cluster.

16. The computing system of claim 15, wherein said at least one social networking behaviour comprises at least one of: a tweet, a post, a comment associated with the queried topic in the social data network, and being a follower of the queried topic.

17. The computing system of claim 15, wherein the communication device and a social networking data module receive a stream of social networking data, which comprises the posts from the set of users, and store the social networking data in the data store.

18. The computing system of claim 15, wherein the number of letters in each letter segment is three.

19. The computing system of claim 15, wherein selecting for each user a pre-defined number of posts and associating with the respective user further comprises the processor executing the following instructions:

modeling each user in the set of users as a node and determining a list of topics for each user:

extracting text from the posts and filtering out irrelevant topics by performing text processing for each topic associated with each user to output the list of topic words; and, providing a relationship mapping between the topic words and the corresponding user associated with a respective topic word.

20. The computing system of claim 19, further comprising the processor executing the following instructions:

performing text processing on a given topic word to determine relationships across at least a pre-defined size of each letter segment associated with each user to other users of the set of users, the letter segments overlapping each other; and wherein computing a given statistical likelihood value for a given letter segment associated with a given user comprises identifying the number of times the given letter segment appears relative to the number of all topic words associated with the given user.

21. The computing system of claim 15, wherein the letter segments overlap each other in a given topic word, and the statistical likelihood values are arranged into an n-gram probability matrix based on a pre-defined number of letters for each letter segment.

22. The computing system of claim 15, wherein clustering further comprises utilizing at least one of: k-means clustering, spherical k-means clustering, Principal component analysis (PCA), Mean shift clustering.

* * * * *